United States Patent
Sottiaux et al.

(10) Patent No.: US 9,382,933 B2
(45) Date of Patent: Jul. 5, 2016

(54) SELF PUMPING AND PRIMING ADHESIVE JOINT SYSTEM

(75) Inventors: Daniel P. Sottiaux, Flower Mound, TX (US); Frank B. Stamps, Colleyville, TX (US)

(73) Assignee: Textron Innovations Inc., Providence, RI (US)

( * ) Notice: Subject to any disclaimer, the term of this patent is extended or adjusted under 35 U.S.C. 154(b) by 306 days.

(21) Appl. No.: 13/430,117

(22) Filed: Mar. 26, 2012

(65) Prior Publication Data

US 2012/0251225 A1 Oct. 4, 2012

Related U.S. Application Data

(60) Provisional application No. 61/471,232, filed on Apr. 4, 2011.

(51) Int. Cl.
| C09J 5/00 | (2006.01) |
| F16B 11/00 | (2006.01) |
| B64D 27/26 | (2006.01) |

(52) U.S. Cl.
CPC .............. *F16B 11/008* (2013.01); *B64D 27/26* (2013.01); *C09J 5/00* (2013.01); *Y10T 403/343* (2015.01); *Y10T 403/473* (2015.01); *Y10T 403/52* (2015.01)

(58) Field of Classification Search
CPC .... F16B 11/006; F16B 11/008; F16B 13/141; F16B 47/003; C09J 5/00
USPC ............................ 403/265, 268, 288; 156/295
See application file for complete search history.

(56) References Cited

U.S. PATENT DOCUMENTS

| 2,322,587 | A | * | 6/1943 | Payne | F16L 13/11 |
| | | | | | 285/285.1 |
| 2,741,498 | A | * | 4/1956 | Elliott | F16L 13/007 |
| | | | | | 285/148.11 |
| 3,545,795 | A | * | 12/1970 | Hertel et al. | 403/265 |
| 3,909,045 | A | * | 9/1975 | Meagher | 285/22 |
| 4,299,508 | A | | 11/1981 | Kerscher et al. | |
| 4,561,670 | A | * | 12/1985 | Takada | F16B 11/008 |
| | | | | | 280/281.1 |
| 4,705,286 | A | | 11/1987 | Lauzier et al. | |
| 4,954,421 | A | | 9/1990 | Sullivan | |
| 5,090,837 | A | | 2/1992 | Mower | |

(Continued)

FOREIGN PATENT DOCUMENTS

| CH | 542393 | A | | 9/1973 | |
| EP | 0046869 | | * | 3/1982 | ............... F16D 1/02 |
| FR | 2109232 | A5 | | 5/1972 | |
| FR | 2677723 | A1 | | 12/1992 | |

OTHER PUBLICATIONS

Translation of FR 2109232. Pont, Mousson. May 26, 1972. Tubular Body Mounting Flange.*

(Continued)

*Primary Examiner* — Josh Skroupa
(74) *Attorney, Agent, or Firm* — James E. Walton

(57) ABSTRACT

A tube form assembly includes an inner member and an outer member. Each of the inner and outer members has an offset which creates a cavity therebetween. During assembly of the tube form assembly, an adhesive is located in the cavity and squeezed out and through the adjacent bond lines between the inner member and outer member. The pressurization and flow of adhesive outward from the cavity facilitates removal of air bubbles, as well as prevents the introduction of air bubbles into the bond line.

15 Claims, 6 Drawing Sheets

(56) References Cited

U.S. PATENT DOCUMENTS

| | | | |
|---|---|---|---|
| 5,188,478 A | | 2/1993 | Bitsch et al. |
| 5,421,781 A | * | 6/1995 | Mackellar .................... 464/181 |
| 5,613,794 A | * | 3/1997 | Isaac et al. .................... 403/265 |
| 5,632,685 A | * | 5/1997 | Myers .......................... 403/268 |
| 5,665,187 A | * | 9/1997 | Mackellar .................... 403/265 |
| 5,984,369 A | * | 11/1999 | Crook et al. ................. 285/21.1 |
| 6,944,999 B2 | | 9/2005 | Criado |
| 7,175,204 B2 | * | 2/2007 | Tarbutton et al. ............. 280/785 |

OTHER PUBLICATIONS

Translation of FR 2677723. Antoine, et al. Dec. 18, 1992. Device for Elastic Connection Between Two Components, Method for Manufacturing this Device, and Installation for Implementing this Method.*

Office Action issued by the European Patent Office in related European patent application 12162386.2, mailed May 23, 2013, 4 pages.

Office Action issued by the European Patent Office in related European patent application 12162386.2, mailed Sep. 25, 2013, 4 pages.

Extended European Search Report from the European Patent Office in related European Patent Application No. 12162386.2, 5 pages, date Sep. 6, 2012.

Office Action dated Jul. 2, 2014 from counterpart CN App. No. 2012100965725.

Office Action issued by the Canadian Patent Office in related Canadian patent application 2,773,175, mailed Mar. 12, 2014, 3 pages.

Office Action dated Feb. 28, 2015 from counterpart CN App. No. 2012100965725.

* cited by examiner

SELF PUMPING AND PRIMING ADHESIVE JOINT SYSTEM

CROSS REFERENCE TO RELATED APPLICATIONS

This application claims the benefit of U.S. Provisional Application No. 61/471,232, filed 4 Apr. 2011, titled "Self Pumping and Priming Adhesive Joint System," which is hereby incorporated by reference for all purposes as if fully set forth herein.

BACKGROUND

1. Technical Field

The present application relates to a method and apparatus for an adhesive joint that controls the adhesive bond during assembly.

2. Description of Related Art

Tube form assemblies are particularly useful in many aerospace structures. A typical tube form assembly includes an outer cylindrical member bonded to an inner cylindrical member. The structural integrity of the tube form assembly relies in part on the quality of the adhesive bond between the outer cylindrical member and the inner cylindrical member. Conventional assembly methods allow for the introduction of air bubbles in the adhesive. Air bubbles in the adhesive result in voids in the adhesive bond line, thereby decreasing the bond strength. Voids in the adhesive bond line may lead to failure to the tube form assembly. If the tube form assembly is a flight critical part on an aircraft, failure of the bond can lead to catastrophic results.

Hence, there is a need for an improved adhesive joint in a tube form assembly.

DESCRIPTION OF THE DRAWINGS

The novel features believed characteristic of the system and method of the present application are set forth in the appended claims. However, the system and method themselves, as well as a preferred mode of use, and further objectives and advantages thereof, will best be understood by reference to the following detailed description when read in conjunction with the accompanying drawings, wherein:

DESCRIPTION OF THE PREFERRED EMBODIMENT

Illustrative embodiments of the system and method of the present application are described below. In the interest of clarity, not all features of an actual implementation are described in this specification. It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would nevertheless be a routine undertaking for those of ordinary skill in the art having the benefit of this disclosure.

In the specification, reference may be made to the spatial relationships between various components and to the spatial orientation of various aspects of components as the devices are depicted in the attached drawings. However, as will be recognized by those skilled in the art after a complete reading of the present application, the devices, members, apparatuses, etc. described herein may be positioned in any desired orientation. Thus, the use of terms such as "above," "below," "upper," "lower," or other like terms to describe a spatial relationship between various components or to describe the spatial orientation of aspects of such components should be understood to describe a relative relationship between the components or a spatial orientation of aspects of such components, respectively, as the device described herein may be oriented in any desired direction.

Figure 1:
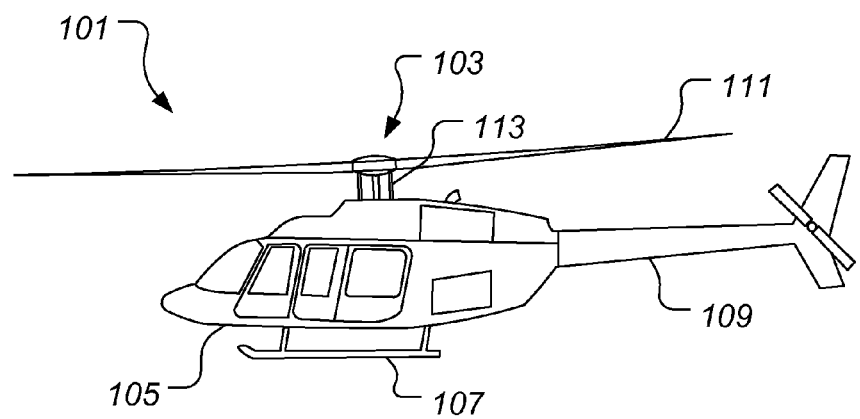
FIG. 1 is a side view of a rotorcraft, according to an embodiment of the present application.

Referring to FIG. 1 in the drawings, a rotorcraft 101 is illustrated. Rotorcraft 101 has a rotor system 103 with a plurality of rotor blades 111. The pitch of each rotor blade 111 can be selectively controlled by a pitch link 113 in order to selectively control direction, thrust, and lift of rotorcraft 101. Rotorcraft 101 further includes a fuselage 105, landing gear 107, and an empennage 109.

Figure 2:
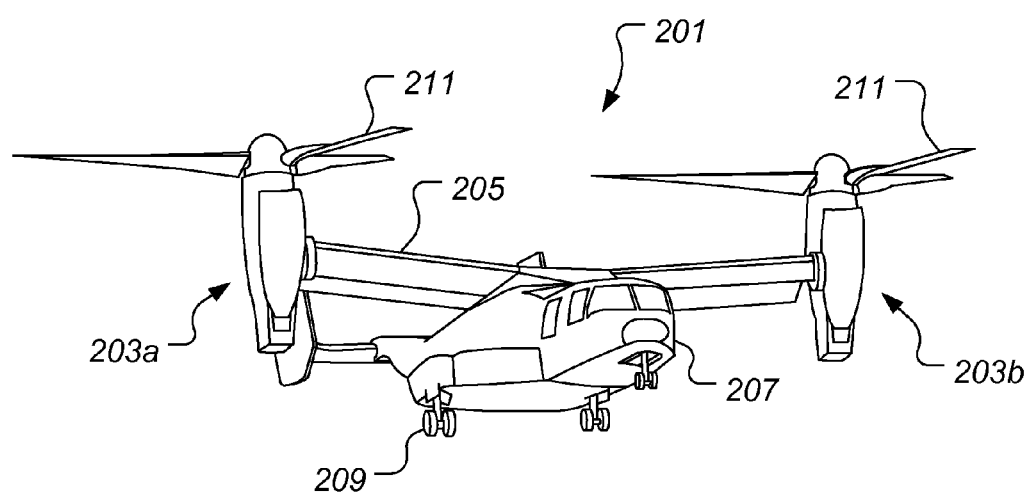
FIG. 2 is a perspective view of a tilt rotor aircraft, according to an embodiment of the present application.

Referring to FIG. 2 in the drawings, a tiltrotor aircraft 201 is illustrated. Tiltrotor aircraft 201 includes a fuselage 207, a landing gear 209, a wing 209, and rotatable nacelles 203a and 203b. Each nacelle 203a and 203b includes a plurality of rotor blades 211. The position of nacelles 203a and 203b, as well as the pitch of rotor blades 211, can be selectively controlled in order to selectively control direction, thrust, and lift of tiltrotor aircraft 201.

It can be especially desirable for components of rotorcraft 101 and tiltrotor aircraft 201 to be manufactured as a tube form assembly. Illustrative tube form assemblies can include: a pitch link, a vibration isolator, control link, a pitch restraint link, a lead/lag damper, to name a few. As such, the system and method of the present application may be utilized to manufacture tube form assemblies for rotorcraft 101 and tiltrotor aircraft 201. It should be appreciated that the system and method of the present application may be utilized to manufacture tube form assemblies on other types of aircraft, as well as non-aircraft applications. For example, the system and method of the present application may be utilized to manufacture a tube form assembly on a space vehicle, ground vehicle, surface marine vehicle, amphibious marine vehicle, and submersible marine vehicle, to name a few examples.

The system of the present application includes a tube form assembly 101 with components that are configured to self pump adhesive to the bond line during the assembly process. The self pumping of adhesive expels air bubbles, thereby minimizing voids in the adhesive bond line. The aforementioned features of tube form assembly 101 are described further herein. The method of the present application includes steps for assembling a tube for assembly so as to expel any air bubbles in the adhesive, thereby minimizing voids in the adhesive bond line.

Figures 3, 4:
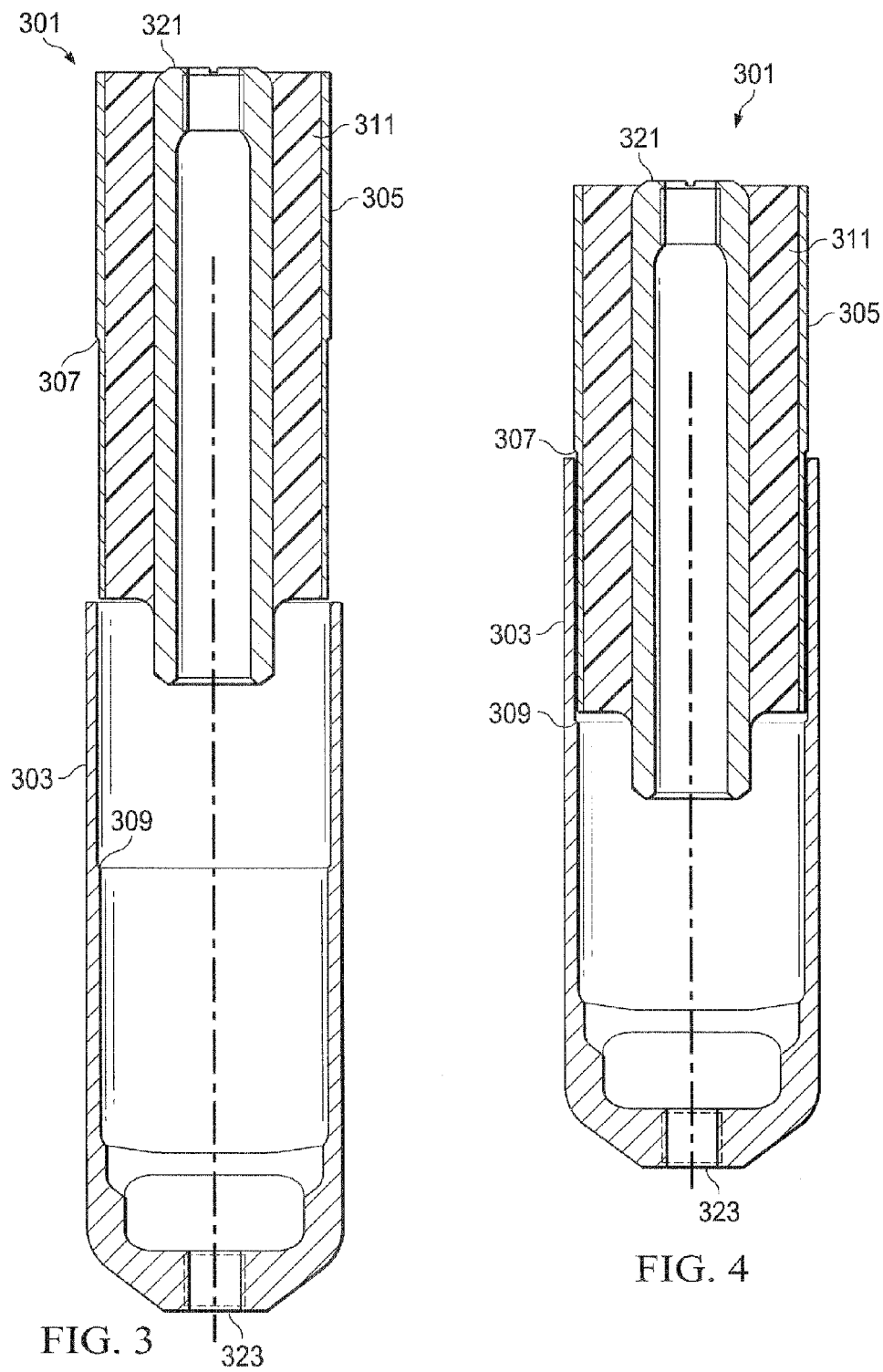
FIG. 3 is a cross-section view of a tube form assembly, according to the preferred embodiment of the present application.
FIG. 4 is a cross-section view of a tube form assembly, according to the preferred embodiment of the present application.
Figure 5:
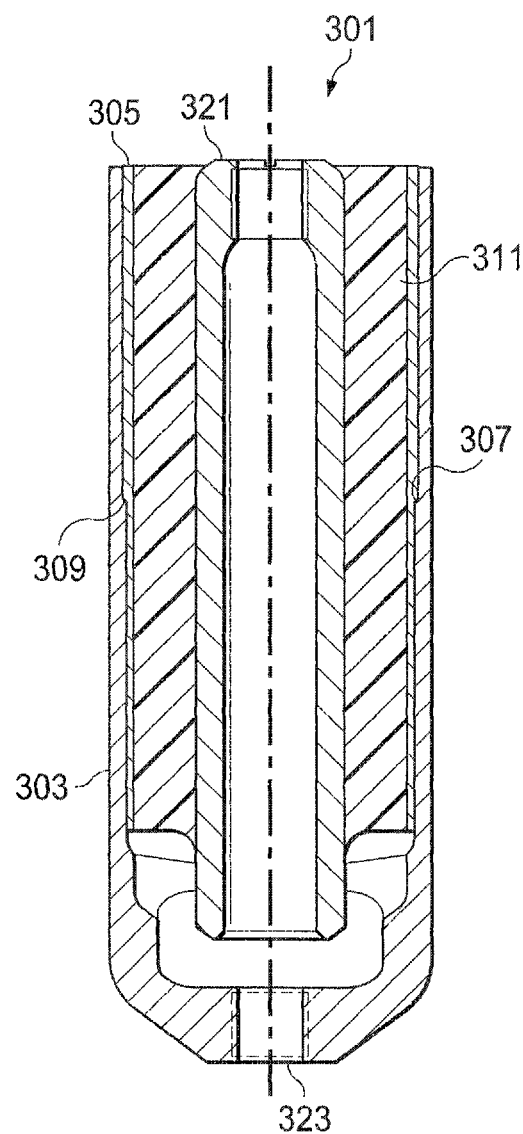
FIG. 5 is a cross-section view of a tube form assembly, according to the preferred embodiment of the present application.

Referring to FIGS. 3-5, tube form assembly 301 is illustrated in progressive assembly views. Tube form assembly 301 includes an outer member 303 and an inner member 305. Inner member 305 and outer member 303 are bonded together with adhesive 313 (shown in FIGS. 6-8). Adhesive 313 is preferably a paste adhesive, or other adhesive that exhibits pre-cure fluid properties during assembly of components of tube form assembly 301. In one embodiment, adhesive 313 is EA 9346 paste adhesive manufactured by Henkel and Hysol Corporations. It should be appreciated that exact type of adhesive 313 is implementation specific. In the illustrated embodiment, each of the outer member 303 and inner member 305 are cylindrically shaped. However, alternative embodiments can include any variety of shapes, including but not limited to: prismatic, triangular, and hexagonal, to name a few. Further, outer member 303 and inner member 305 may also have interlocking and/or mating features, such as splined, keyed, and/or threaded portions.

In the illustrative embodiment, tube form assembly 301 is a spring structure configured to treat dynamic loading generated by rotor system 103 in rotorcraft 101. An elastomer member 311 provides the spring constant to treat forces in the load path between inner member 305 and outer member 303. In the illustrated embodiment, a first attachment member 321 and a second attachment member 323 are configured for attaching tube form assembly 301 to structures that exhibit relative oscillatory motion or forces therebetween. Elastomer member 311 is attached between an inner surface of inner member 305 and an outer surface of first attachment member 321. For example, tube form assembly can be a gearbox pylori mounting link that provides structural support and vibration attenuation between the gearbox pylori and the aircraft structure. It should be appreciated that tube form assembly 301 is merely exemplary of a wide variety of tube form assembly structures. For example, tube form assembly 301 can include fluid reservoirs with one or more fluid passages that are configured for provide fluid damping and/or isolation as the fluid is forces back and forth between the fluid reservoirs.

The inner member 305 has an inner offset 307. Similarly, outer member 303 has an outer offset 309. Inner offset 307 is a physical change in the size of the outer periphery or outer surface of inner member 305. In the illustrated embodiment, inner offset 307 represents a step change in the outer diameter of inner member 305. Outer offset 309 is a physical change in the size of the inner periphery or inner surface of outer member 303. In the illustrated embodiment, outer offset 309 represents a step change in the inner diameter of outer member 303. As discussed further herein, inner offset 307 and outer offset 309 form a cavity 315 therebetween when inner member 305 and outer member 303 are mated together. In the illustrated embodiment, each offset 307 and 309 includes an arcuate or radius surface in the step change transition. The volume of cavity 315 decreases during assembly of inner member 305 and outer member 303. Cavity 315 acts as an integral adhesive pump that pumps adhesive 313 outward as inner member 305 and outer member 303 are assembled together, as discussed further herein.

Figure 6:
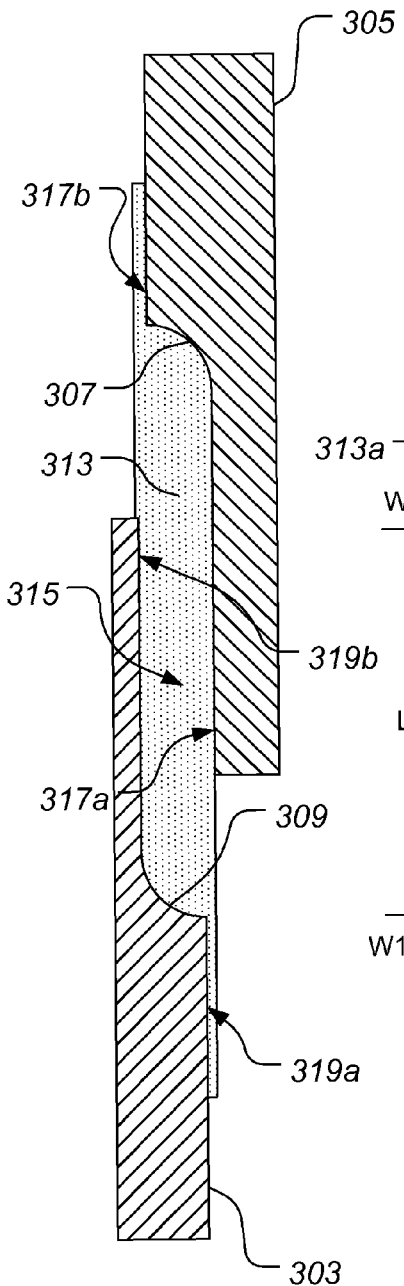
FIG. 6 is partial sectional view of a tube form assembly, according to the preferred embodiment of the present application.
Figure 7:
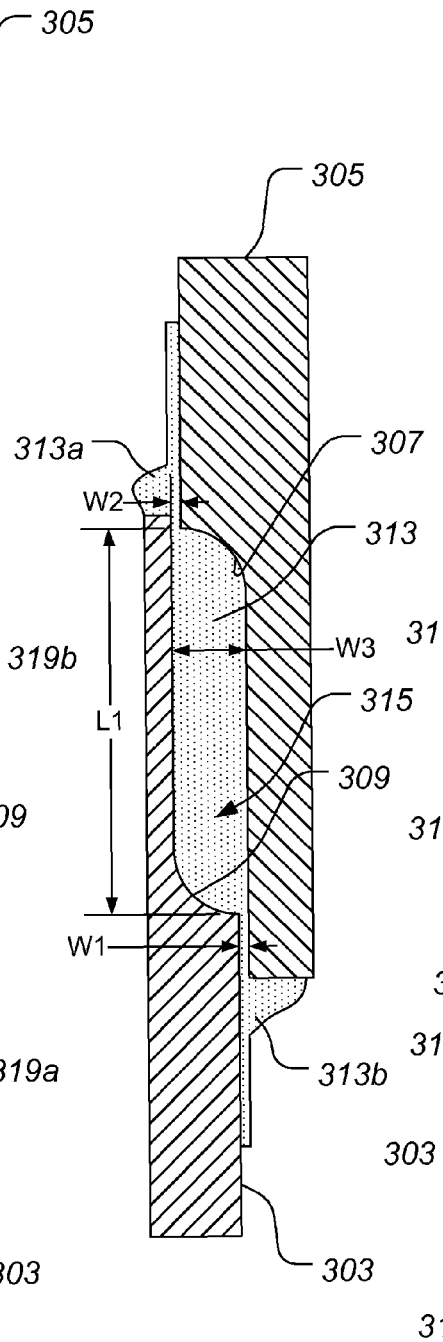
FIG. 7 is partial sectional view of a tube form assembly, according to the preferred embodiment of the present application.
Figure 8:
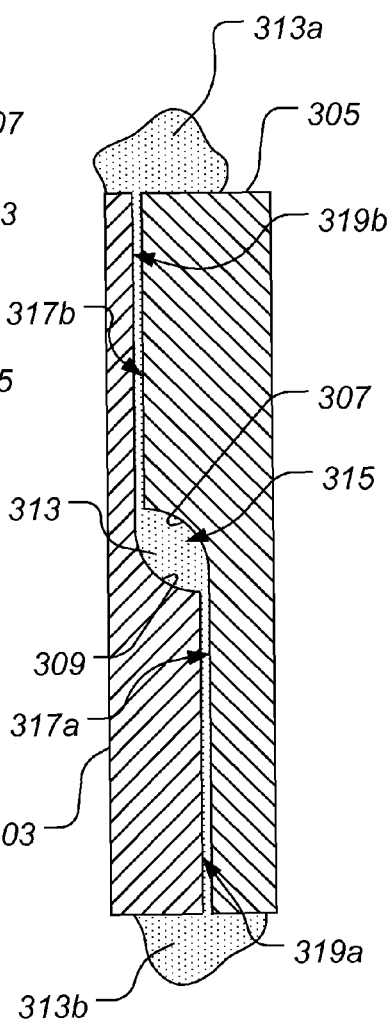
FIG. 8 is partial sectional view of a tube form assembly, according to the preferred embodiment of the present application.

Referring now to FIGS. 6-8, a partial sectional view of tube form assembly 301 is illustrated. FIGS. 6-8 progressively illustrate the process for assembling tube form assembly 301. Referring specifically to FIG. 6, adhesive 313 is deposited in the cavity 315, as well as portions of bonding surfaces 317a, 317b, 319a, and 319b. Referring also to FIG. 7, inner member 305 and outer member 303 are translated together along lengthwise centerline axis. In the illustrated embodiment, the volume of cavity 315 is defined by the width W3 and length L1. As inner member 305 and outer member 303 are compressed together, a volume of high pressure is created in cavity 315. As the volume of cavity 315 decreases, the increase in pressure causes adhesive 313 to flow toward the extremities. As such, cavity 315 acts an integral pump by pumping adhesive 313 outward as inner member 305 and outer member 303 are squeezed together. During this assembly procedure, air bubbles are also squeezed out along with excess adhesive. Further, as the volume of cavity 315 decreases, the resulting increase in pressure causes compressible air bubbles in adhesive 313 to migrate toward zones of lower pressure outward from cavity 315. Furthermore, the flow of adhesive outward acts to prevent air bubbles from being suctioned from the exterior into the bondlines between bond surfaces 317a and 319a, as well as the bondlines between bond surfaces 317b and 319b.

Referring now also to FIG. 8, inner member 305 and outer member 303 are illustrated in a final assembly position. Excess adhesive 313a and 313b has been squeezed out, along with air bubbles. The dimensions W1 and W2 (shown in FIG. 7) are the thickness between bond surfaces 317a and 319a, as well as between bond surfaces 317b and 319b. In the illustrative embodiment, W1 and W2 are approximately 0.005 inch. However, the exact dimensions W1 and W2 are implementation specific. Moreover, specific paste adhesives have specific optimal bond thickness or ranges of thickness. As such, it is preferred that thickness W1 and W2 are selectively tailored in accordance with the specific adhesive 313 being used.

After inner member 305 and outer member 303 are located in a final position, excess adhesive 313a and 313b can be removed. Further, adhesive 313 can be cured in accordance with the implementation specific requirements of the adhesive 313.

Figure 9:
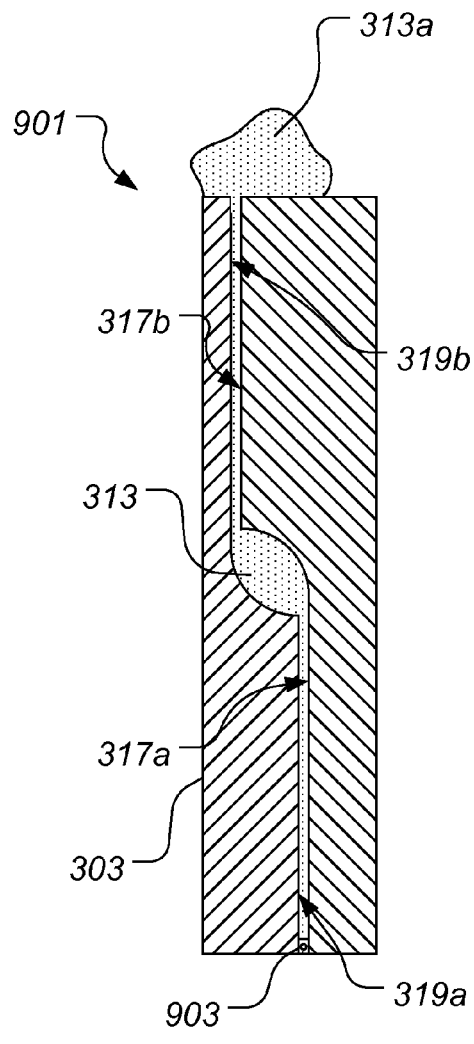
FIG. 9 is partial sectional view of a tube form assembly, according to an alternative embodiment of the present application.

Referring to FIG. 9, an alternative embodiment tube form assembly 901 is illustrated. Tube form assembly 901 is substantially similar to tube form assembly 301, except for including a seal 903. Seal 903 acts to cause adhesive 313 to be squeezed out only one direction. Seal 903 is particularly useful in embodiments have a closed end which would prevent a manufacturer from having access to clean and remove adhesive that would otherwise squeeze out in the area of seal 903.

Figure 10:
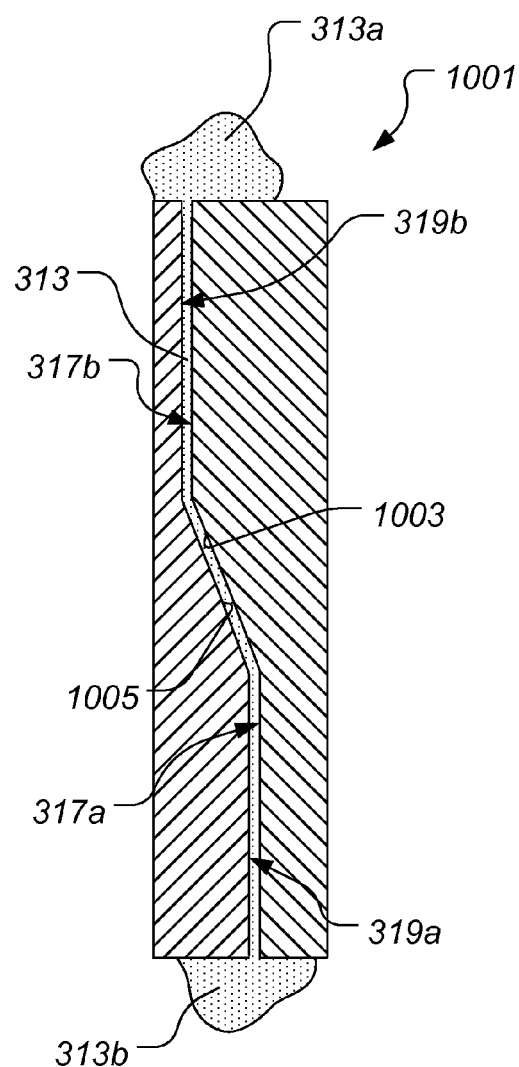
FIG. 10 is partial sectional view of a tube form assembly, according to an alternative embodiment of the present application.

Referring to FIG. 10, an alternative embodiment tube form assembly 1001 is illustrated. Tube form assembly 1001 is substantially similar to tube form assembly 301 except inner offset 107 and outer offset 109 are replaced with an inner tapered surface 1003 and an outer tapered surface 1005, respectively. As such, a cavity, similar to cavity 315, is formed between the tapered surfaces 1003 and 1005. During assembly, adhesive 313 is squeezed out as inner member 305 and outer member 303 are squeezed together. Tube form assembly 1001 is exemplary of a wide variety of volume shapes that cavity 315 can form.

Figure 11:
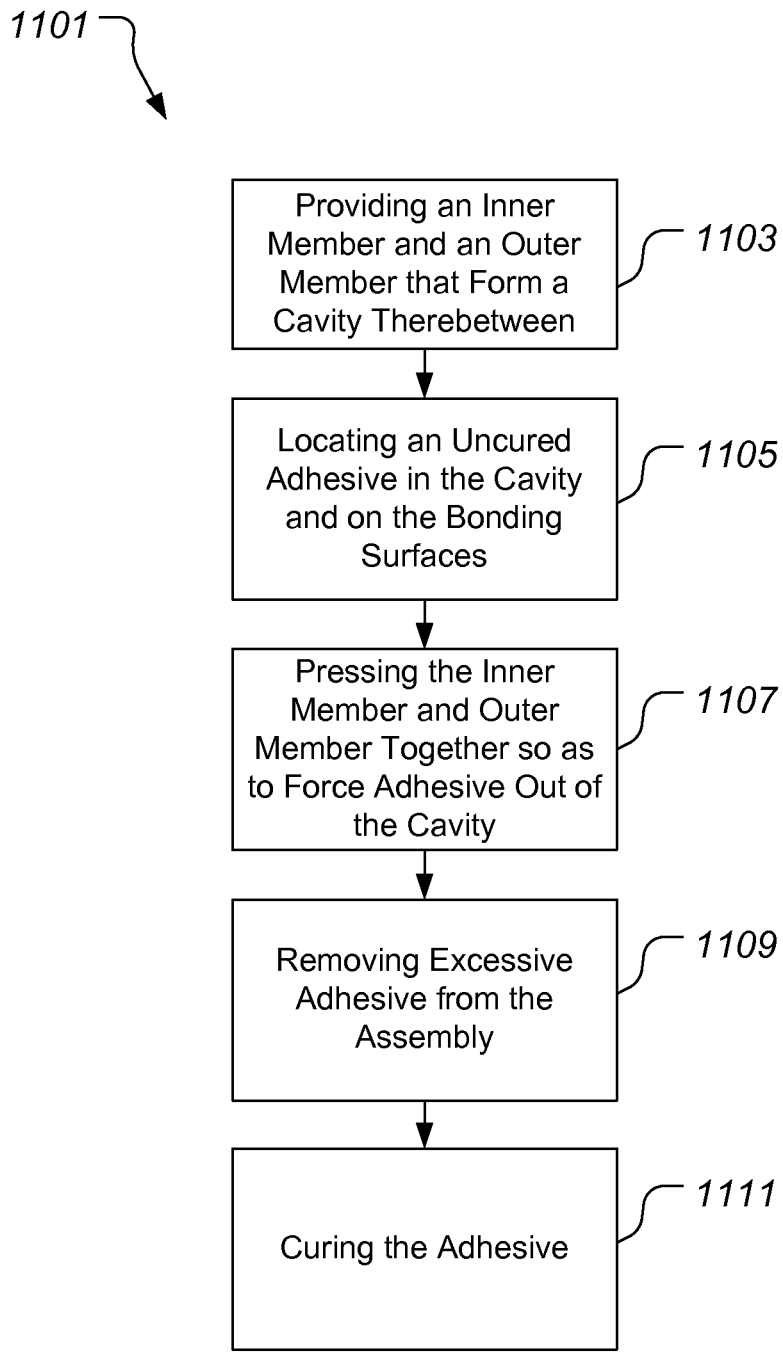
FIG. 11 is a schematic view of a method for manufacturing a tube form assembly, according to an illustrative embodiment of the present application.

Referring now also to FIG. 11, a method 1101 for manufacturing a tube form assembly, such as tube form assembly 301, is schematically illustrated. A step 1103 includes providing an inner member and an outer member that form a cavity therebetween. An exemplary inner member and outer member are illustrated in FIGS. 3-10, and further described herein. A step 1105 includes locating an uncured adhesive in the cavity and on the bonding surfaces. Step 1105 is illustrated in FIG. 6, and further described herein. A step 1107 includes pressing the inner member and the outer member together so as to force a portion of the adhesive out of the cavity. Step 1107 is illustrated in FIGS. 7 and 8, and further described herein. In one embodiment, the inner member and outer member are each attached to tooling so that the translation of inner member and outer member is maintained along an axial centerline of the tube form assembly. A step 1109 is an optional step that includes removing the excess adhesive from the tube form assembly. The excess assembly is illustrated at least in FIG. 8. A step 1111 includes curing the adhesive so that inner member and outer member are securely bonded together. The exact curing process is implementation specific, as different adhesives require different curing processes, as one of ordinary skill in the art will fully appreciate with benefit of this disclosure. For example, step 1111 can include subjecting the adhesive to an elevated temperature for a duration of time.

The disclosed tube form assembly, and method of making the same, provide significant advantages, including: 1) providing a self pumping adhesive joint which prevents drawing air bubbles into the bond line during assembly; and 2) providing a self pumping adhesive joint which expels air bubbles during assembly.

It is apparent that a system and method with significant advantages has been described and illustrated. The particular embodiments disclosed above are illustrative only, as the application may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the application. Although the system of the present application is shown in a limited number of forms, it is not limited to just these forms, but is amenable to various changes and modifications without departing from the spirit thereof. Accordingly, the protection sought herein is as set forth in the claims below.

The invention claimed is:

1. A tube form assembly, comprising:
   an attachment member configured to couple to a structure exhibiting oscillatory motion;
   an elastomer member coupled to an outer surface of the attachment member;
   an inner member coupled to the elastomer member;
   an outer member for translatingly receiving at least a portion of the inner member;
   an inner offset adjoining an outer surface of the inner member, the inner offset including an arcuate portion thereof such that a cross-section of the arcuate portion of the inner offset taken along a longitudinal axis of the tube form assembly is curved,
   wherein the arcuate portion and the outer surface of the inner member meet at a non-arcuate corner portion of the inner member;
   an outer offset located in an inner surface of the outer member, the outer offset being arcuate such that a cross-section of the outer offset taken along the longitudinal axis of the tube form assembly is curved;
   a cavity formed between the inner offset and the outer offset; and
   an adhesive located between the inner member and the outer member;
   wherein assembly of the inner member and the outer member causes a portion of the adhesive to be squeezed away from the cavity.

2. The tube form assembly according to claim 1, wherein the volume of the cavity is configured to contain an amount of adhesive.

3. The tube form assembly according to claim 1, further comprising:
   a seal located at an end portion between the inner member and the outer member, the seal being configured to force the adhesive to be squeezed away from the seal.

4. The tube form assembly according to claim 1, wherein the inner member and the outer member are cylindrically shaped.

5. The tube form assembly according to claim 1, wherein the tube form assembly is configured for use as a gearbox pylon mounting link for an aircraft.

6. The tube form assembly according to claim 1, wherein the elastomer member has a spring rate for treating an oscillatory motion.

7. A method for assembling a tube form assembly, the method comprising:
   providing an attachment member configured to couple to a structure exhibiting oscillatory motion;
   providing an elastomer member coupled to an outer surface of the attachment member;
   providing an inner member coupled to the elastomer member and an outer member, the inner member and the outer member having contours which create a cavity therebetween, wherein the cavity is formed by a first offset in the inner member and a second offset in the outer member, the first offset including an arcuate portion thereof such that a cross-section of the first offset taken along a longitudinal axis of the tube form assembly is curved, and the second offset being arcuate such that a cross-section of the second offset taken along a longitudinal axis of the tube form assembly is curved, wherein the arcuate portion of the first offset and an outer surface of the inner member meet at a non-arcuate corner portion of the inner member;
   applying an adhesive in the cavity; and
   pressing the inner member and the outer member together so that a volume of the cavity decreases, thereby squeezing a portion of the adhesive towards one or more extremities of the tube form assembly.

8. The method according to claim 7, wherein the adhesive is a paste adhesive.

9. The method according to claim 7, further comprising: removing excess adhesive.

10. The method according to claim 7, wherein the pressing of the inner member and the outer member also includes restricting the outer member and the inner member in a radial direction.

11. The method according to claim 7, wherein the pressing of the inner member and the outer member together includes translating the inner member relative to the outer member along a central axis of the tube form assembly.

12. The method according to claim 7, further comprising: curing the adhesive.

13. The method according to claim 7, wherein the pressing of the inner member and the outer member together so that the volume of the cavity decreases includes expelling air bubbles in the adhesive by a resulting increase in pressure in the cavity.

14. The method according to claim 7, further comprising configuring the tube form assembly for use as a link for an aircraft.

15. The method according to claim 7, wherein the cavity is located at a uniform radius from a central axis of the tube form assembly.

* * * * *